(12) United States Patent
Simoens

(10) Patent No.: US 7,798,314 B2
(45) Date of Patent: Sep. 21, 2010

(54) CONVEYOR SEALING PLATE

(75) Inventor: Hervé Simoens, Marcq en Baroeul (FR)

(73) Assignee: Societe Financiere de Gestion, Roubaix (FR)

( * ) Notice: Subject to any disclaimer, the term of this patent is extended or adjusted under 35 U.S.C. 154(b) by 18 days.

(21) Appl. No.: 12/300,120

(22) PCT Filed: May 4, 2007

(86) PCT No.: PCT/FR2007/000765

§ 371 (c)(1),
(2), (4) Date: Nov. 7, 2008

(87) PCT Pub. No.: WO2007/128917

PCT Pub. Date: Nov. 15, 2007

(65) Prior Publication Data

US 2009/0139842 A1    Jun. 4, 2009

(30) Foreign Application Priority Data

May 10, 2006   (FR) .................................. 06 04125

(51) Int. Cl.
*B65G 21/20* (2006.01)
(52) U.S. Cl. ................ 198/836.1; 198/836.3
(58) Field of Classification Search ............ 198/836.1, 198/836.3
See application file for complete search history.

(56) References Cited

U.S. PATENT DOCUMENTS

| 3,344,909 | A | | 10/1967 | Hansen et al. | |
| 4,231,471 | A | * | 11/1980 | Gordon | 198/836.1 |
| 5,513,743 | A | | 5/1996 | Brink | |
| 6,405,856 | B2 | * | 6/2002 | Sjostrand | 198/836.1 |
| 6,588,584 | B2 | * | 7/2003 | Craig et al. | 198/836.1 |
| 7,500,552 | B2 | * | 3/2009 | Switzeny | 198/836.3 |

FOREIGN PATENT DOCUMENTS

| DE | 43 08 980 A1 | 7/1994 |
| DE | 299 18 166 U1 | 2/2000 |
| EP | 0 462 847 A1 | 12/1991 |
| EP | 0 795 672 A1 | 9/1997 |
| FR | 2 548 742 A1 | 1/1985 |
| JP | 7 002333 A | 1/1995 |
| JP | 10 152214 A | 6/1998 |

OTHER PUBLICATIONS

International Application No. PCT/FR2007/000765—PCT International Search Report mailed Oct. 19, 2007.

* cited by examiner

*Primary Examiner*—James R Bidwell
(74) *Attorney, Agent, or Firm*—Miles & Stockbridge, P.C.

(57) ABSTRACT

A sealing strip comprising a part of a configuration for fastening to a guide wall of a conveyor, the fastening configuration allowing for interlocking via elastic deformation of one of two parts of the fastening configuration.

20 Claims, 1 Drawing Sheet

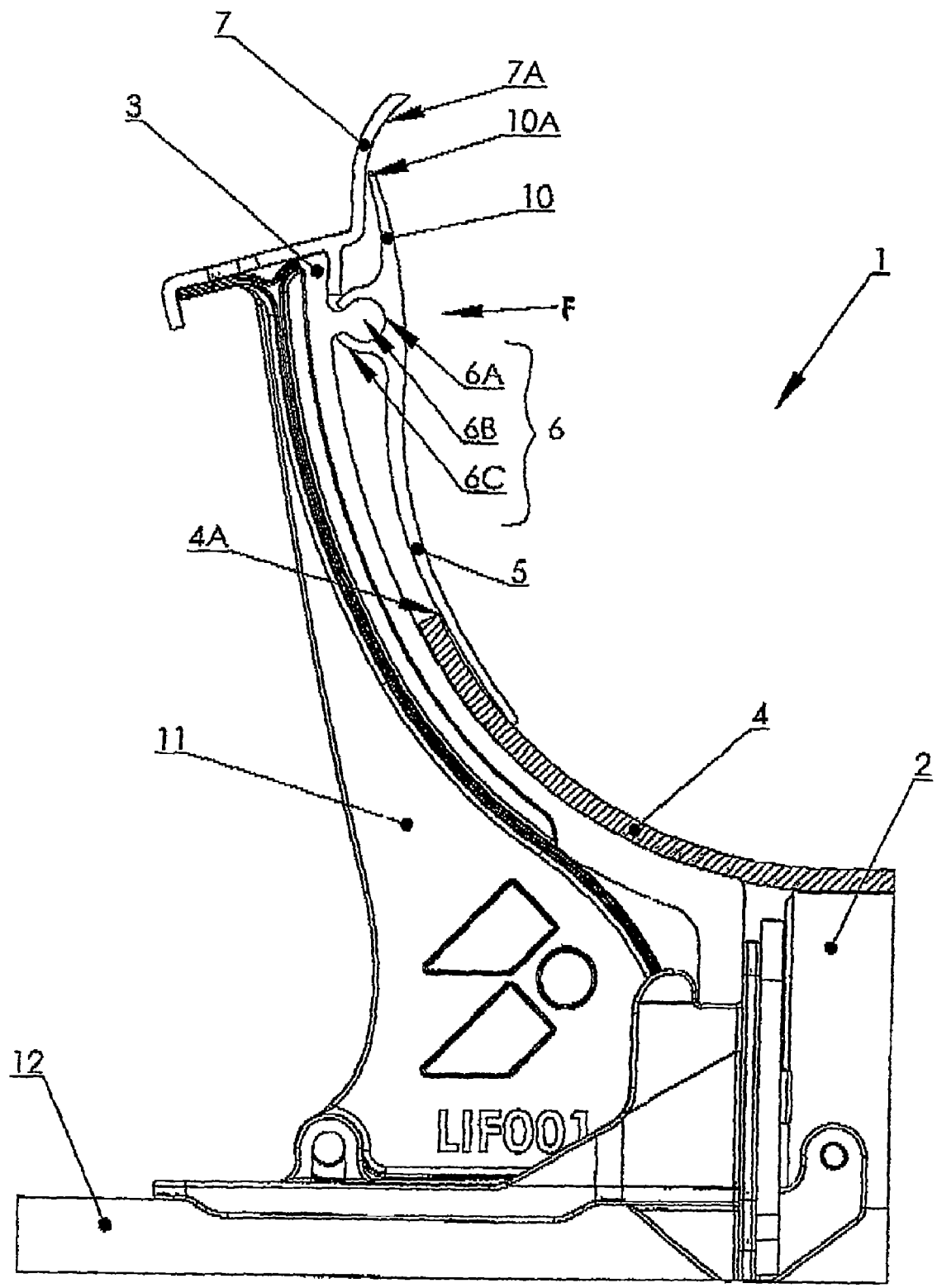

CONVEYOR SEALING PLATE

CROSS REFERENCE TO RELATED APPLICATIONS

This application claims the benefit of PCT Application No. PCT/FR2007/000765, filed May 4, 2007, now pending, which claims the benefit of and priority to French Application No. 0604125, filed May 10, 2006, all of which are incorporated herein by reference in their entirety.

BACKGROUND OF THE INVENTION

The invention relates to a sealing strip for a trough-shaped conveyor.

It also relates to the conveyor provided with said strip.

The use of a belt conveyor to transport bulk materials from one place to another is known.

This belt conveyor has a trough-shaped cross-section so that the belt that molds to this trough forms a chute capable of containing the bulk material.

More particularly, there is a known conveyor whose cross-section is defined by a roller with a horizontal axis and curved so-called guide walls located on either side of the roller.

The conveyor belt glides over these guide walls.

The conveyor belt extends over just part of the guide wall so that it can have a slight transverse motion.

The bulk material is deposited in the center part of the trough, but sometimes, as a result of speed, this material more or less spreads out and can run past the lateral edges of the belt, or even further when the loading speed is too high relative to the linear speed of the belt. The latter phenomenon occurs mainly during gravity loading. In order to keep the bulk material from coming between the conveyor belt and the guide surface, which would impair the operation of the conveyor, a sealing strip attached by its top part onto the inside surface of the guide wall overlaps the top of the conveyor belt.

In theory, the level of bulk material cannot reach the level of the top of the strip.

At the level where it is overlapped by the sealing strip, the conveyor belt glides between the guide wall and the so-called lower surface of the sealing strip.

Due to friction, wear occurs on the sealing strip, and the sealing strip must therefore be replaced.

These sealing strips are generally attached either by means of eyelets with screws and nuts or by a jaw of a clamp that applies the upper edge of the strip to the guide wall. This jaw is applied by tightening screws.

These operations for replacing the strip are long and tedious.

It is also clear that manipulating these screws is made more difficult by dust which accumulates on the screw threads or by corrosion due to the nature or the wetness of these bulk materials.

There is an external strip known from EP 462 847, mounted using a dovetail system. Such an assembly is slide-mounted, as indicated by the assembly in U.S. Pat. No. 5,513,743.

There is a strip known from U.S. Pat. No. 3,344,909 which comprises V-shaped wings at its apex, thus forming a male part, said male part being deformed so as to be inserted into a female part, which must be opened widely in order to insert the wings of the male part one after another. This conveyor is not suitable for transporting bulk materials. The same is true for the device in DE 299 18 166.

If that were the case, dust would accumulate in the female part, resulting in a need to remove the dust prior to replacing the strip.

SUMMARY OF THE INVENTION

The invention proposes a solution which facilitates the mounting and demounting of these strips for bulk material conveyors and which does not require lengthy cleaning operations prior to replacing the strip.

To this end, the subject of the invention is a sealing strip comprising a means for fastening to a so-called guide wall of a bulk conveyor, the fastening means being a means of interlocking via the elastic deformation of one of two parts composing said fastening means, this strip being characterized in that the part composing said fastening means of the strip is a female part which is deformed so as to clasp the male part borne by the conveyor.

DETAILED DESCRIPTION

The invention will be more clearly understood with the help of the following description given as a nonlimiting example in reference to the drawing, which schematically illustrates a cutaway view of a conveyor equipped with a strip according to the invention.

Referring to the drawing, we see a bulk material conveyor 1.

This conveyor comprises means such that the conveyor belt with which it is equipped takes the shape of a trough or chute so as to be able to contain the bulk material.

In the example illustrated, the trough shape is defined by a roller 2 with a horizontal axis flanked by curved guide walls 3.

The lower surface of the endless belt 4 rests on the roller and glides over the lower part of the guide walls.

A sealing strip 5 is mounted on each guide wall, attached by its top part, and the bottom of this sealing strip overlaps the lateral edge 4A of the endless belt.

In order to be held in place on the conveyor, the strip 5 comprises a complementary part 6A of a fastening means 6, the other part 6B being part of the conveyor and particularly the curved guide wall 3.

The fastening means 6 of the strip is a means of interlocking via the elastic deformation of one 6A of the two parts 6A, 6B composing said fastening means.

The part 6A composing said fastening means that is borne by the strip is a female part which is deformed so as to clasp the male part borne by the conveyor.

This part surrounds the male part 6B as tightly as possible so that when the strip is removed, another strip can be installed on the male part immediately without a need to clean the male part.

There cannot be any accumulation of material between the female part and the male part.

For the interlocking, the part 6A borne by the strip is essentially moved in a direction F substantially perpendicular to the inside surface of the guide wall.

More precisely, the guide wall carries a longitudinal bead 6B that runs parallel to its upper edge, and the strip comprises an open channel 6A whose lips 6C can be briefly elastically separated so that this channel can cover the bead.

The opening of the channel is placed against the bead, and with a press of the hand, the lips separate, then return to their initial position.

When the channel (female part) is placed on the bead (male part), the lips 6C of this channel clasp the bead and prevent the strip from sliding along the bead.

The bead is preferably of circular cross-section. It is non-deformable.

The channel, i.e. the female part, is obtained by extrusion with the rest of the strip.

At the level of this female part, said part 6A will be rigidified, either by locally increasing the thicknesses or by locally using a material that is chosen so as to be less flexible than the part that will rest on the endless belt.

In essence, the part of the strip resting on the endless belt must be relatively flexible in order to mold to the curvature, while the "clasping" part must be firmly attached.

Co-extrusion can be used to form this strip.

In the case where the guide wall is made of rigid synthetic material, it is possible to extrude the bead at the same time as the guide wall.

It is understood that engaging the female part requires a simple push of the hand.

In order to reduce dust, a cover 7 is provided on this conveyor so as to form a tubular volume.

Remarkably, the upper edge 10 of the sealing strip 5 comprises at least one lip 10A that is curved near the top so as to rest on the lower surface 7A of the cover 7 that closes the conveyor. This reduces the possibility that the material will penetrate behind the strip and escape to the outside.

As may be seen, the upper edge of this strip comprises a lip 10A forming a flap.

This flap also prevents the material from coming between the strip and the lateral wall.

The female "clasping" means is thus borne by the back of the strip.

The strip can therefore be quickly replaced when necessary, without using any tools.

This provides a simple solution for replacing the strips.

The bead borne by the guide wall can either be added on or obtained during the production of this wall.

This guide wall is, for example, mounted on a tilting support 11 resting on a crosspiece 12.

This crosspiece 12 also supports the roller 2.

What is claimed is:

1. A sealing member comprising means for fastening the member to a wall of a conveyor, the fastening means being adapted to interlock via elastic deformation of one of two parts of the fastening means, wherein one of the two parts is a female part that is disposed on a portion of the member and the other of the two parts is a male part that is disposed on a portion of the conveyor, wherein the female part is adapted to being deformed so as to clasp the male part, and wherein the female part further comprises two projecting lips, the projecting lips being adapted to be elastically separated so as to be placed on a bead.

2. A sealing member according to claim 1, wherein the bead is substantially circular in cross-section.

3. A sealing member according to claim 1, further comprising an overlapping portion adapted to rest on an endless belt of the conveyor, wherein the female part is more rigid than the overlapping portion.

4. A sealing member according to claim 3, wherein an upper edge portion of the member comprises a lip that forms a flap.

5. A sealing member according to claim 1, further comprising an upper portion having a curved lip adapted to contact a lower surface of a conveyor cover.

6. A sealing member according to claim 1, wherein the female part is disposed on a back side of the member.

7. A sealing member according to claim 1, further comprising an overlapping portion adapted to rest on an endless belt of the conveyor, wherein the female part is more rigid than the overlapping portion.

8. A sealing member according to claim 7, wherein an upper edge portion of the member comprises a lip that forms a flap.

9. A sealing member according to claim 7, wherein the female part is disposed on a back side of the member.

10. A sealing member according to claim 3, wherein the female part is disposed on a back side of the member.

11. A trough shaped conveyor comprising a sealing member, the sealing member comprising means for fastening the member to a wall of a conveyor, the fastening means being adapted to interlock via elastic deformation of one of two parts of the fastening means, wherein one of the two parts is a female part that is disposed on a portion of the member and the other of the two parts is a male part that is disposed on a portion of the conveyor, wherein the female art is adapted to being deformed so as to clasp the male art, and wherein the female part further comprises two projecting lips, the projecting lips being adapted to be elastically separated so as to be placed on a bead.

12. A trough shaped conveyor according to claim 11, further comprising two guide walls disposed on either side of a roller, wherein each guide wall includes a longitudinal bead running parallel to an upper edge of the respective guide wall, the bead being adapted to be covered by the female part of the fastening means.

13. A trough shaped conveyor according to claim 12, wherein a bottom portion of the member overlaps a lateral edge of an endless belt of the conveyor.

14. A trough shaped conveyor according to claim 11, wherein a bottom portion of the member overlaps a lateral edge of an endless belt of the conveyor.

15. A trough shaped conveyor according to claim 11, wherein the bead is substantially circular in cross-section.

16. A trough shaped conveyor according to claim 11, further comprising an overlapping portion adapted to rest on an endless belt of the conveyor, wherein the female part is more rigid than the overlapping portion.

17. A trough shaped conveyor according to claim 16, wherein an upper edge portion of the member comprises a lip that forms a flap.

18. A trough shaped conveyor according to claim 16, wherein the female part is disposed on a back side of the member.

19. A trough shaped conveyor according to claim 11, further comprising an upper portion having a curved lip adapted to contact a lower surface of a conveyor cover.

20. A trough shaped conveyor according to claim 11, wherein the female part is disposed on a back side of the member.

* * * * *

UNITED STATES PATENT AND TRADEMARK OFFICE
CERTIFICATE OF CORRECTION

| | | |
|---|---|---|
| PATENT NO. | : 7,798,314 B2 | |
| APPLICATION NO. | : 12/300120 | |
| DATED | : September 21, 2010 | |
| INVENTOR(S) | : Herve Simoens | |

It is certified that error appears in the above-identified patent and that said Letters Patent is hereby corrected as shown below:

Column 4 – Line 24, delete "art" and insert --part--.

Column 4 – Line 25, delete "art" and insert --part--.

Signed and Sealed this

Thirtieth Day of November, 2010

David J. Kappos
*Director of the United States Patent and Trademark Office*